United States Patent
Bowers

(10) Patent No.: US 12,033,392 B2
(45) Date of Patent: Jul. 9, 2024

(54) SIGNAL-TO-NOISE RATIO (SNR) IDENTIFICATION WITHIN A SCENE

(71) Applicant: Mobileye Vision Technologies Ltd., Jerusalem (IL)

(72) Inventor: Gabriel Bowers, Jerusalem (IL)

(73) Assignee: Mobileye Vision Technologies AG, Jerusalem (IL)

( * ) Notice: Subject to any disclaimer, the term of this patent is extended or adjusted under 35 U.S.C. 154(b) by 381 days.

(21) Appl. No.: 17/550,042

(22) Filed: Dec. 14, 2021

(65) Prior Publication Data

US 2022/0189178 A1 Jun. 16, 2022

Related U.S. Application Data

(60) Provisional application No. 63/125,464, filed on Dec. 15, 2020.

(51) Int. Cl.
| | |
|---|---|
| *G06V 20/56* | (2022.01) |
| *B60W 60/00* | (2020.01) |
| *G06T 3/4053* | (2024.01) |
| *G06T 7/194* | (2017.01) |
| *G06T 7/90* | (2017.01) |

(52) U.S. Cl.
CPC ............ *G06V 20/56* (2022.01); *G06T 3/4053* (2013.01); *G06T 7/194* (2017.01); *G06T 7/90* (2017.01); *B60W 60/001* (2020.02); *B60W 2420/403* (2013.01)

(58) Field of Classification Search
CPC ...... G06V 20/56; G06V 20/90; G06T 3/4053; G06T 7/194; G06T 7/90; B60W 60/001; B60W 2420/403
See application file for complete search history.

(56) References Cited

U.S. PATENT DOCUMENTS

2019/0306447 A1* 10/2019 Palmer .................. H04N 25/771
2019/0306480 A1* 10/2019 Talagala ............... H04N 23/741

* cited by examiner

*Primary Examiner* — John B Strege
*Assistant Examiner* — Daniel C Chang
(74) *Attorney, Agent, or Firm* — Banner & Witcoff Ltd.

(57) ABSTRACT

Techniques are disclosed for generating a two-dimensional (2D) map of signal-to-noise ratio (SNR) values for sensor-acquired images. The techniques leverage the use of lookup tables (LUTs) to generate a transformation LUT that functions to map pixel values to SNR values. The transformation LUT may be generated by first generating an intermediate LUT that uses the operating parameters identified with the sensor to map pixel values to light level values. The light level values are then used together with an SNR model that outputs a prediction of electrons identified with a signal portion and a noise portion of images acquired by the sensor to thus map the pixel values to SNR values. The 2D map may be used to improve upon the accuracy of the classification of objects and/or scene characteristics for various applications.

24 Claims, 11 Drawing Sheets

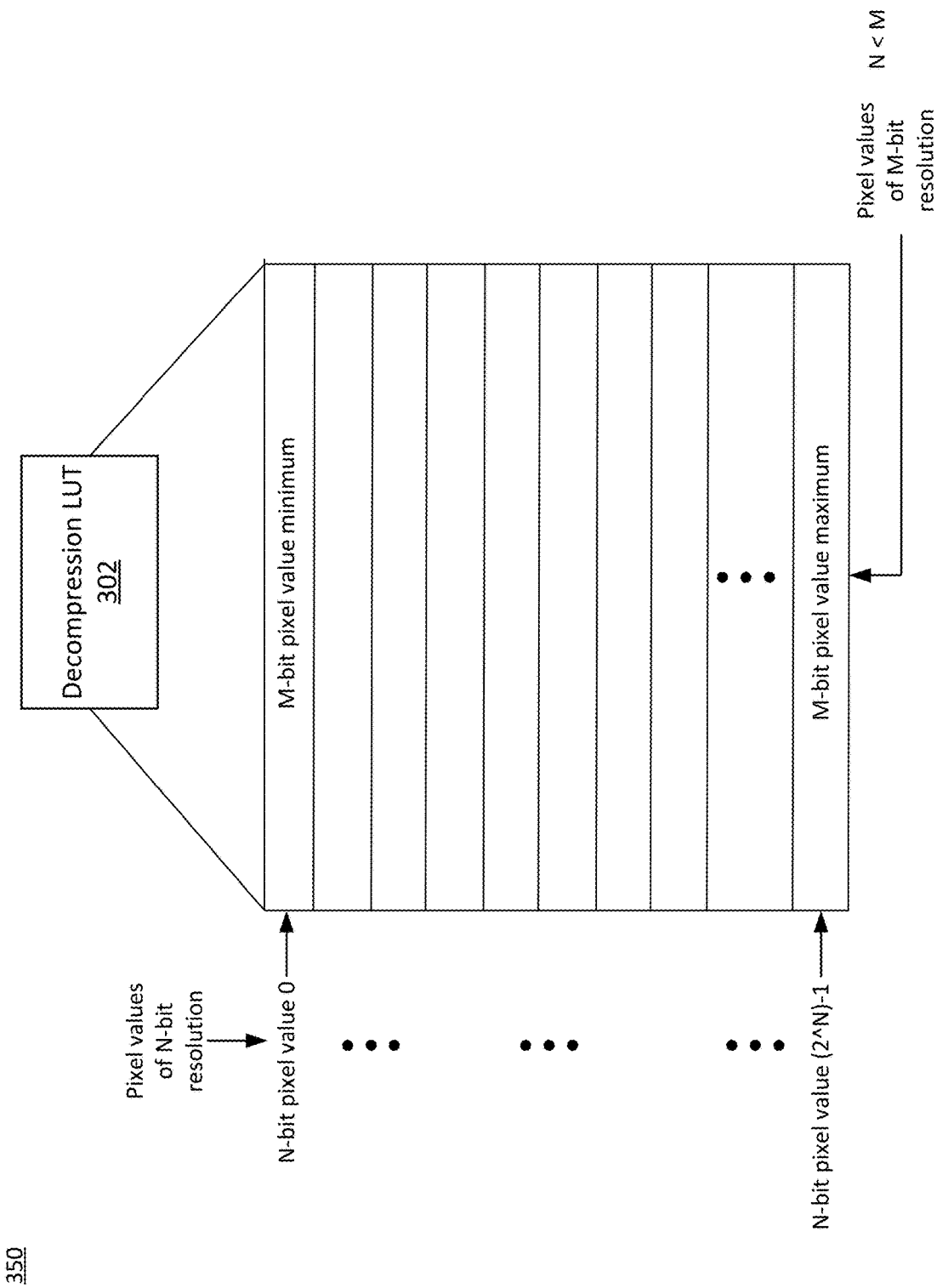

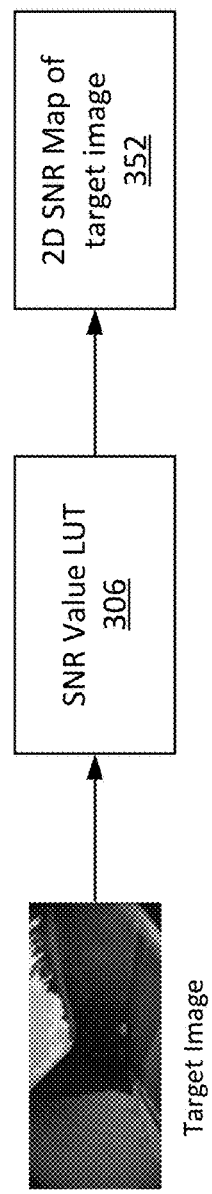

SIGNAL-TO-NOISE RATIO (SNR) IDENTIFICATION WITHIN A SCENE

CROSS-REFERENCE TO RELATED APPLICATIONS

This Application claims priority to provisional application No. 63/125,464, filed on Dec. 15, 2020, the contents of which are incorporated herein by reference in its entirety.

TECHNICAL FIELD

Aspects described herein generally relate to the identification of SNR within a scene using a generated two-dimensional (2D) SNR map that is associated with sensor-acquired images.

BACKGROUND

Autonomous vehicle (AV) and advanced driver-assistance systems (ADAS) sense the environment and provide warnings or make driving decisions while keeping its passengers and surrounding road users and road infrastructure safe. For this purpose, there are sensors installed on the vehicle that allow for the detection of road users, road boundaries, road semantics, etc. The detection of such systems is better when the data provided by the sensors is of high quality (e.g. the ratio of signal to noise (SNR) is high, the signal covers a wide dynamic range, and the contrast of objects in the scene against their backgrounds is significant enough for detection by an AV or ADAS system, etc.). Current sensor-based systems in AVs and ADAS fall short of these requirements.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 3B illustrates an example decompression LUT structure, in accordance with one or more aspects of the present disclosure.

FIG. 3C illustrates an example process flow for generating a 2D SNR map of a target image using the pixel value to SNR value LUT, in accordance with one or more aspects of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
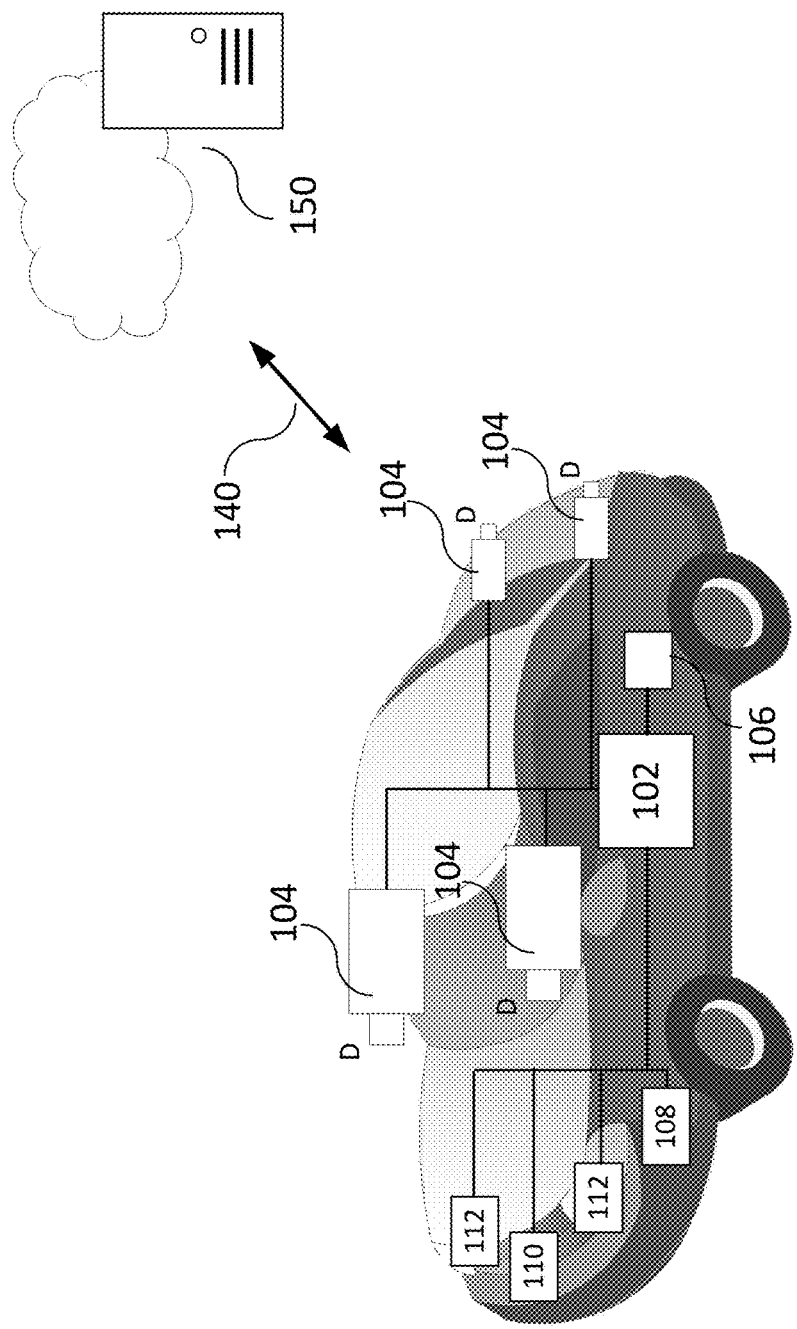
FIG. 1 illustrates an example vehicle in accordance with one or more aspects of the present disclosure.

FIG. 1 shows a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) and are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driving assistance control system, including AV and/or advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle's systems and/or part of an aftermarket system that is installed in the vehicle 100.

The one or more processors 102 may be integrated with or separate from an engine control unit (ECU) of the vehicle 100. The safety system 200 may generate data to control or assist to control the ECU and/or other components of the vehicle 100 to directly or indirectly control the driving of the vehicle 100. However, the aspects described herein are not limited to implementation within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
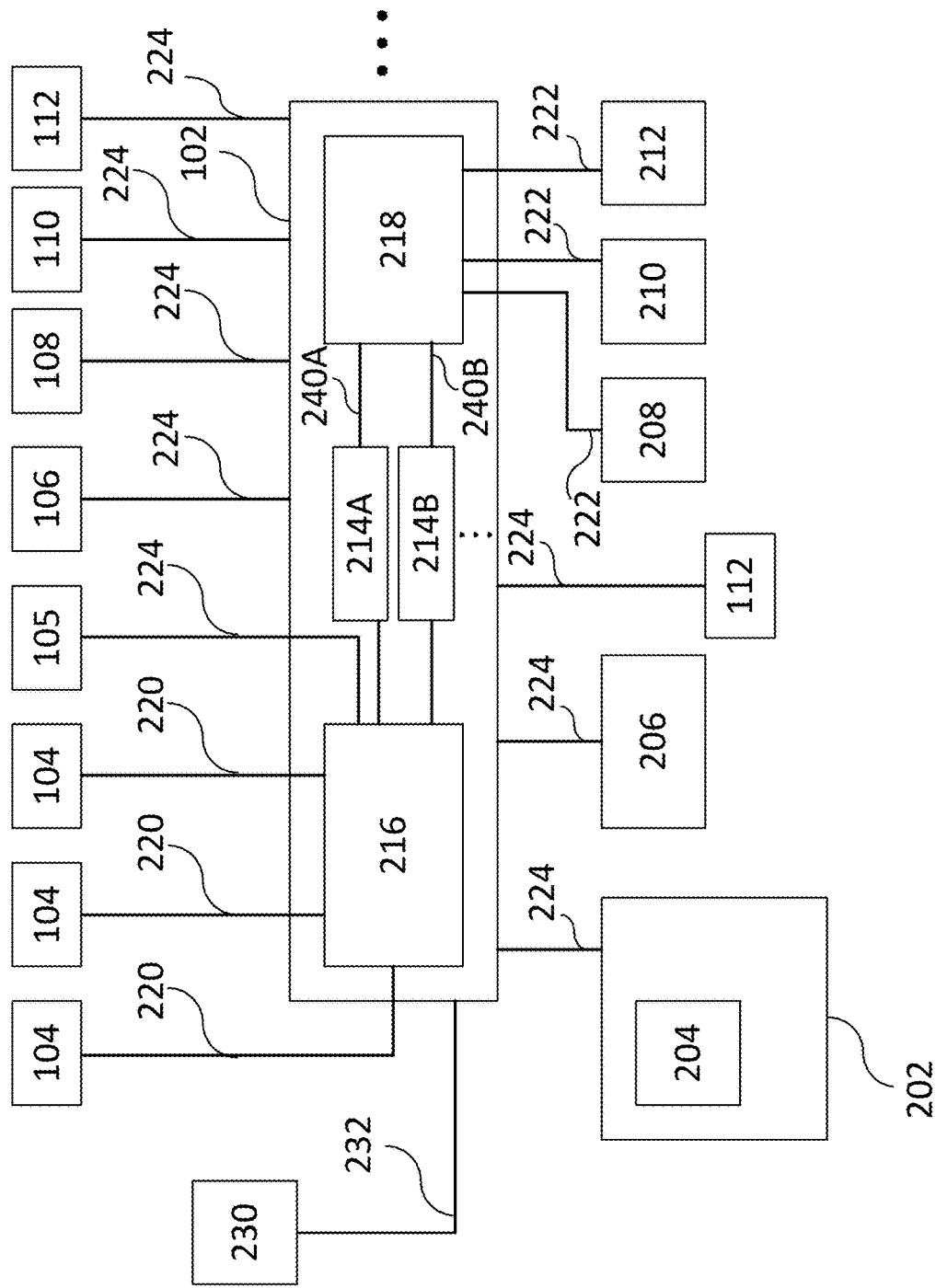
FIG. 2 illustrates various example electronic components of a safety system of a vehicle in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices via one or more wireless links 140. This may include, for instance, communications with a remote server or other suitable computing system 150 as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors and/or the safety system 200 may form the entirety of or portion of an advanced driver-assistance system (ADAS).

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.).

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with the aspects described in further detail below. This may include, for instance, identifying the location of the vehicle 100 (e.g. via the one or more position sensors 106), processing images acquired via a sensor identified with the image acquisition devices 104, and generating and/or modifying lookup tables (LUTs) used to generate a two-dimensional (2D) signal-to-noise ratio (SNR) map associated with acquired images, etc., as further discussed herein.

A relevant memory accessed by the one or more processors 214A, 214B, 216, 218 (e.g. the one or more memories 202) may also store one or more databases and image processing software, as well as a trained system, such as a neural network, or a deep neural network, for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random access memories, read only memories, flash memories, disk drives, optical storage, tape storage, removable storage, or any other suitable types of storage.

The components associated with the safety system 200 as shown in FIG. 2 are illustrated for ease of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions. Again, such a controller or system may be configured to execute the various functions related to generating a 2D SNR map, which may then be correlated to acquired images, and/or to use such 2D SNR maps to perform object or scene characteristic classification based upon the acquired images, to control various aspects of the sensor-based images, the vehicle 100, and/or to control the state of the vehicle 100, as discussed in further detail herein.

In some aspects, the safety system 200 may further include components such as a speed sensor 108 (e.g. a speedometer) for measuring a speed of the vehicle 100. The safety system 200 may also include one or more sensors 105, which may include one or more accelerometers (either single axis or multiaxis) for measuring accelerations of the vehicle 100 along one or more axes, and additionally or alternatively one or more gyro sensors. The one or more sensors 105 may further include additional sensors or different sensor types such as an ultrasonic sensor, infrared sensors, a thermal sensor, digital compasses, and the like. The safety system 200 may also include one or more radar sensors 110 and one or more LIDAR sensors 112 (which may be integrated in the head lamps of the vehicle 100). The radar sensors 110 and/or the LIDAR sensors 112 may be configured to provide pre-processed sensor data, such as radar target lists or LIDAR target lists. The third data interface (e.g., one or more links 224) may couple the one or more sensors 105, the speed sensor 108, the one or more radar sensors 110, and the one or more LIDAR sensors 112 to at least one of the one or more processors 102.

Data referred to as Roadbook Map data may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. Regardless of where the Roadbook Map data is stored and/or accessed, the Roadbook Map data may include a geographic location of known landmarks that are readily identifiable in the navigated environment in which the vehicle 100 travels. The location of the landmarks may be generated from a historical accumulation from other vehicles driving on the same road that collect data regarding the appearance and/or location of landmarks (e.g. "crowd sourcing"). Thus, each landmark may be correlated to a set of predetermined geographic coordinates that has already been established. Therefore, in addition to the use of location-based sensors such as GNSS, the database of landmarks provided by the Roadbook Map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions, which is referred to as "ego-motion." Thus, the vehicle 100 may analyze its own ego-motion to track the position and orientation of the vehicle 100 with respect to the identified known landmarks. Because the landmarks are identified with predetermined geographic coordinates, the vehicle 100 may determine its absolute position based upon a determination of its ego-position with respect to identified landmarks using the landmark-correlated geographic coordinates. Doing so provides distinct advantages that combine the benefits of smaller scale position tracking with the reliability of GNSS positioning systems while avoiding the disadvantages of both systems.

Thus, the Roadbook Map data is generally constructed as part of a series of steps, which may involve any suitable number of vehicles that opt into the data collection process. As each vehicle collects data, the data is classified into tagged data points, which are then transmitted to the cloud or to another suitable external location. A suitable computing device (e.g. a cloud server) then analyzes the data points from individual drives on the same road, and aggregates and aligns these data points with one another. After alignment has been performed, the data points are used to define a precise outline of the road infrastructure. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the Roadbook Map data. This information is then compiled into a Roadbook Map, which constitutes a bank of driving paths, semantic road information such as features and objects, and aggregated driving behavior.

The map database may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the Roadbook Map data, which includes data relating to the position, in a reference coordinate system, of various landmarks such as items, including roads, water features, geographic features, businesses, points of interest, restaurants, gas stations, etc.

The map database 204 may thus store, as part of the Roadbook Map data, not only the locations of such landmarks, but also descriptors relating to those landmarks, including, for example, names associated with any of the stored features, and may also store information relating to details of the items such as a precise position and orientation of items. In some cases, the Roadbook Map data may store a sparse data model including polynomial representations of certain road features (e.g., lane markings) or target trajectories for the vehicle 100. The Roadbook Map data may also include stored representations of various recognized landmarks that may be provided to determine or update a known position of the vehicle 100 with respect to a target trajectory. The landmark representations may include data fields such as landmark type, landmark location, etc., among other potential identifiers. The Roadbook Map data may also include non-semantic features including point clouds of certain objects or features in the environment, and feature point and descriptors.

The map database 204 may be augmented with data in addition to the Roadbook Map data, and/or the map database 204 and/or the Roadbook Map data may reside partially or entirely as part of the remote computing system 150. As discussed herein, the location of known landmarks and map database information, which may be stored in the map database 204 and/or the remote computing system 150, may form what is referred to herein as a "Roadbook Map data." Thus, the one or more processors 102 may process sensory information (such as images, radar signals, depth information from LIDAR or stereo processing of two or more images) of the environment of the vehicle 100 together with position information, such as GPS coordinates, a vehicle's ego-motion, etc., to determine a current location and/or orientation of the vehicle 100 relative to the known landmarks by using information contained in the Roadbook Map. The determination of the vehicle's location may thus be refined in this manner. Certain aspects of this technology may additionally or alternatively be included in a localization technology such as a mapping and routing model.

Image Acquisition and Pixel Value Transformation

Again, the one or more image acquisition devices 104 may form part of the safety system 200, and may be implemented as any suitable number and type of image-based sensors configured to acquire images within any suitable range of wavelengths, such as cameras, LIDAR sensors, etc. In any event, the one or more image acquisition devices 104 may be operated, monitored, and/or controlled via one or more components of the safety system 200, which may be implemented as part of an AV or ADAS system. For instance, the one or more processors 102, one or more of the processors 214A, 214B, 216, 218, etc. may communicate with and/or control the one or more image acquisition devices 104. This may include modifying the operating parameters of the one or more image acquisition devices 104 with respect to how images are acquired, monitoring the settings and/or operating parameters of the one or more image acquisition devices 104, causing the one or more image acquisition devices 104 to acquire images, etc.

As further discussed herein, the safety system 200 may control the one or more image acquisition devices 104 to ensure a high quality images or regions of interest within captured images (e.g. the road surface, objects, etc.). This may be facilitated in accordance with the aspects as further discussed herein by adjusting the operating parameters of an image-based sensor in response to an analysis of statistics taken from an image that are correlated to previously-acquired images, thereby ensuring that future acquired images (or portions thereof) maintain a higher signal-to-noise ratio (SNR). For instance, and as further discussed herein, parts of an image may have different exposure weightings, which may be used to determine the exposure weightings for the next image(s). This may include statistics from the center of the image that identify different exposure weightings than the exposure weightings identified from the corners of the image. Adjustments to the image-based sensor operating parameters may then be made by the safety system 200 (e.g. to the one or more image acquisition devices 104) based on a previously-acquired test image to thereby improve the SNR of a future, target image. These adjustments may be made with respect to the operating parameters of the one or more image acquisition devices 104, and may be derived from statistics measured to detect if the configuration may be improved (e.g., the camera may increase exposure because of a low signal level). Such adjustments may be restricted within predetermined ranges in which the adjustments ensure that the SNR is not reduced.

Thus, to improve the detection of low SNR within any part of an acquired image, the aspects described herein provide an additional low-cost image transform that generates a 2D SNR profile or map corresponding to an acquired target image. The transform is generated using sensor noise models, which are adjusted based upon various sensor operating parameters such as the sensor configuration and/or environmental conditions, as well as noise parameters and/or statistical data derived from one or more captured test images. Some examples of these sensor operating parameters include image brightness, image sensor temperature, the integration and gain used by the multiple exposures used to capture an HDR image, etc. The transform may thus function to predict how an adjustment to the sensor operating parameters may affect the image quality for all parts of a scene and/or for regions of interest within an image identified with a scene and predict noise levels seen at each range of output from the image sensor (dark to bright). Additional detail regarding how the 2D SNR map may be generated for this purpose is discussed in further detail below, which includes the use of lookup tables (LUTs).

Figure 3A:
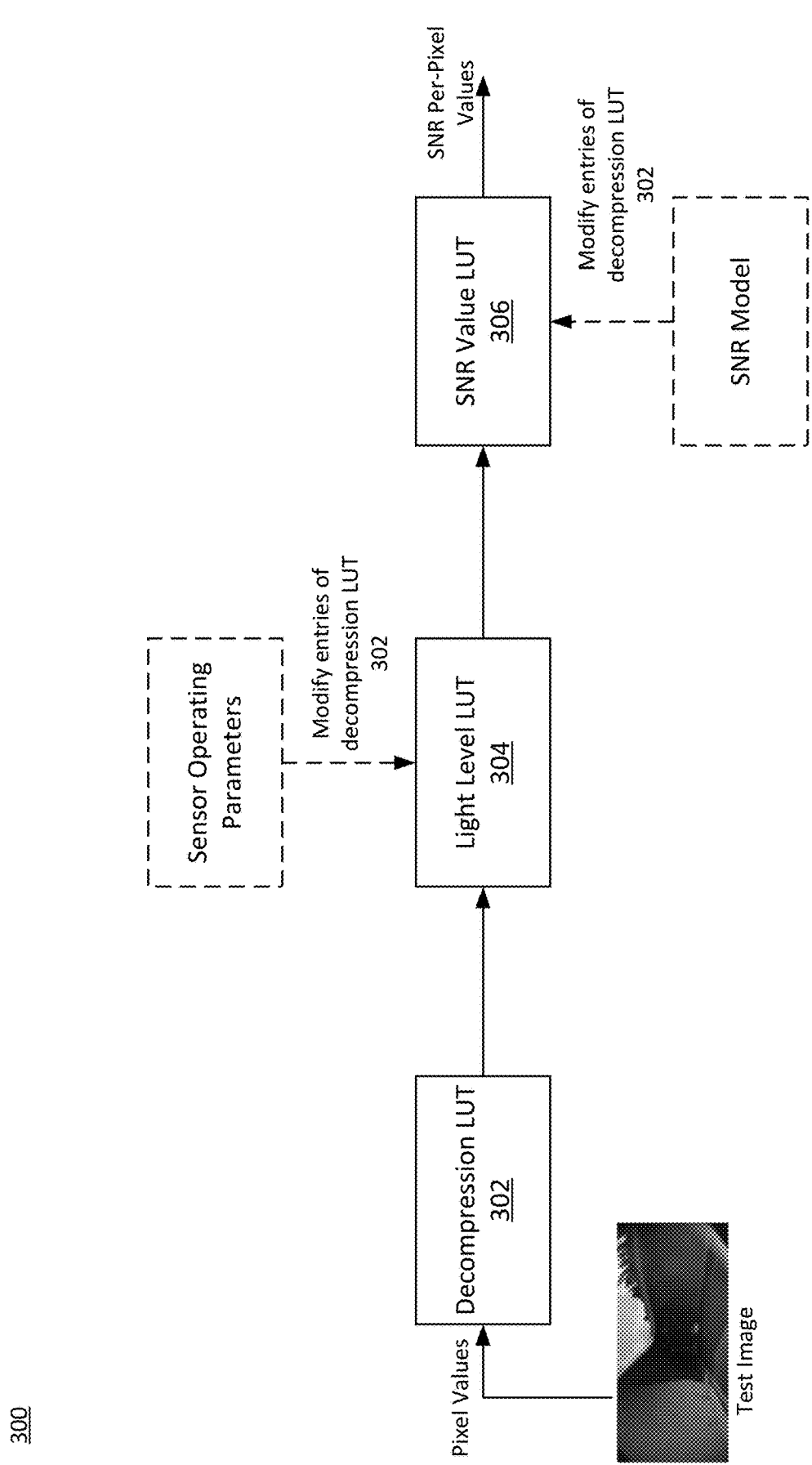
FIG. 3A illustrates an example process flow for generating a pixel value to SNR value lookup table (LUT), in accordance with one or more aspects of the present disclosure.

FIG. 3A illustrates an example process flow for generating a pixel value to SNR value lookup table (LUT), in accordance with one or more aspects of the present disclosure. The functionality associated with the process flow as discussed herein with reference to FIGS. 3A-3C may be executed, for instance, via a suitable computing device and/or processing circuitry identified with the vehicle 100 and/or the safety system 200. This may include, for example, the one or more processors 102, one or more of the processors 214A, 214B, 216, 218, etc., executing instructions stored in a suitable memory (e.g. the one or more memories 202). In other aspects, the functionality associated with the process flow as discussed herein with reference to FIGS. 3A-3C may be executed, for instance, via processing circuitry identified with any suitable type of computing device that may be identified with the vehicle 100 (e.g. an aftermarket product) or otherwise communicates with one or more components of the vehicle 100.

The process flow 300 as shown in FIG. 3A may begin with the use of a test image. The test image may be acquired via the one or more image acquisition devices 104. The test image may be received from the one or more image acquisition devices 104 as the test image is acquired, or alternatively may be stored in any suitable memory, such as the one or more memories 202 for example.

In any event, the test image may be identified with any suitable number of pixels, each having a respective pixel value. Thus, the test image may be identified with a set of pixel values, with each one of the set of pixel values corresponding to a respective pixel of the test image. The pixel values may, in some aspects, represent compressed pixel values having any suitable N-bit resolution, with N representing any suitable number. The compression used may be of any suitable type, such as a least-significant bit (LSB) compression technique that is often used for imaging applications. This may be particularly useful, for instance, when the one or more image acquisition devices 104 acquire the test image in accordance with an N-bit analog-to-digital converter (ADC), and the set of pixel values represent high dynamic range (HDR) pixel values identified with a higher M-bit resolution. This may be the case, for example, when each pixel value identified with the test image represents a weighted sum of different N-bit pixel values corresponding to different integration times, which may be used as part of a known technique for compressing HDR pixel values and thus acquiring HDR images in accordance with a lower N-bit resolution.

Thus, in accordance with such aspects, each one of the set of pixel values identified with the test image represents compressed pixel values having (i.e. being represented in) an N-bit resolution, which may be decompressed to yield pixel values represented in a higher, M-bit resolution. The aspects described herein use an example case of N=12 bits and M=24 bits by way of example and not limitation. Thus, the N- and M-bit resolutions may represent any suitable bit resolution values such that N<M. For example, the compressed pixel values of the test image may each represent 10-bit, 12-bit, 14-bit, 16-bit, etc. compressed pixel values, and be decompressed to 22-bit, 24-bit, 26-bit, 28-bit pixel values, etc.

To perform decompression of the pixel values constituting the test image, the process flow 300 may implement a decompression LUT 302. The decompression LUT 302 may be stored in any suitable memory (e.g. the one or more memories 202) and be generated, for example, via the one or more processors 102, one or more of the processors 214A, 214B, 216, 218, etc. in accordance with the particular N-bit and M-bit resolutions that are desired for the operation and configuration of the one or more image acquisition devices 104.

The decompression LUT 302 is shown in further detail in FIG. 3B having a structure that is shown for ease of explanation and by way of example and not limitation. As shown in FIG. 3B, the decompression LUT 302 is illustrated using the example of the test image having compressed pixel values identified with a N-bit resolution. Thus, each pixel value identified with the test image may have a digital value between 0 and (2^N)−1. For an N-bit resolution of 12, each pixel value identified with the test image may have a value between 0 and 4095, which represents the total number of LUT entries in the decompression LUT 302. Each one of the entries of the decompression LUT 302 stores a corresponding digital pixel value having a higher, M-bit resolution, which is mapped to the corresponding lower resolution N-bit digital pixel value. The M-bit resolution values stored in the entries of the decompression LUT 302 may be arranged to correlate with the N-bit pixel values in any suitable manner, which may be based upon the original compression of the pixel values in the test image for a particular application. For instance, a compression transform (not shown) may be implemented to provide the pixel value for the test image, which may include a classical piece-wise linear transform that is applied by a sensor identified with the one or more image acquisition devices 104 to compress the measured pixel signal (e.g. in LSB), as well as the signal-chain within the sensor to convert light to the pixel level within the image. Thus, in an aspect, the N-bit and M-bit pixel values may be mapped to one another in the decompression LUT 302 based upon the same classical piece-wise linear transform that was used for compression of the pixel values, to thereby reverse the compression process and provide decompression.

Thus, the decompression LUT 302 functions to decompress the compressed pixel values identified with pixels in the test image represented in the N-bit resolution to decompressed pixel values represented in the M-bit resolution. To do so, the decompression LUT 302 functions to map the set of pixel values represented as the N-bit resolution to entries in the decompression LUT 302 having the M-bit resolution. In other words, each one of the (2^12) entries of the decompression LUT 302 may be considered an index to a corresponding M-bit pixel value entry contained in the decompression LUT 302 at that indexed location.

Thus, the pixel values identified with the test image may be transformed via application (i.e. mapping) of the pixel values via the decompression LUT 302 to yield decompressed M-bit test image pixel values. These decompressed pixel values correspond to, for each pixel, the overall output of the image sensor in response to a particular scene, which represents the aggregation of all sensor operating parameters to yield a brightness level associated with each respective pixel. Thus, the various sensor operating parameters that influence the brightness level of each M-bit decompressed pixel value are intrinsic to the output of the decompression LUT 302. That is, the sensor operating parameters impact the resulting decompressed pixel levels, although the more granular aspects of the sensor operation, such as light level per pixel, which are influenced by these operating parameters, are not directly identifiable from the decompressed pixel values.

The light level per pixel information is valuable, however, to determine the SNR per pixel. Therefore, aspects include leveraging the various sensor operating parameters of the image sensor used to generate the test image to modify the entries the decompression LUT 302 to generate an intermediate LUT. This intermediate LUT, or light level LUT 304 as further discussed herein, is then used to generate an SNR LUT 306 for determining the SNR per pixel of the test image based upon the operating parameters of the sensor, and may additionally or alternatively include other factors. The structure of the light level LUT 304 may correspond to that of the decompression LUT 302, with the contents of the LUT entries being modified as further discussed below. As a result, the light level LUT 304 functions to transform the compressed N-bit pixel values identified with the test image to decompressed M-bit values identified with a light level per respective pixel.

To do so, the entries of the light level LUT 304 may be modified based upon any suitable type of information related to the sensor used to acquire the test image, which may be known a priori, acquired, and/or detected (e.g. via communications with the one or more image acquisition devices 104). In an aspect, the entries of the decompression LUT 302 may be modified based upon one or more operating parameters identified with the sensor used to acquire the test image, which may encompass sensor parameters related to the operation and/or configuration of the sensor such that entries of the light level LUT 304 represent light levels mapped to respective compressed (i.e. N-bit) pixel values. Some non-limiting examples of the operating parameters that may be leveraged in this manner include one or more of an image brightness (which may be identified via the entries of the decompression LUT 302), a sensor temperature, exposure settings such as integration and gain settings, sensor sensitivity, transaction factors, etc., of the sensor used to acquire the test image.

Thus, the operating parameters of the sensor used to acquire the test image may be used to derive the light level per pixel that resulted in the compressed pixel values. As one illustrative example, the compressed pixel values of the test image may represent a brightness level per pixel. Each compressed pixel value may thus represent a multiplication of a light level that is the result of charge for a photodiode identified with that respective pixel being integrated over a particular duration of time, which is then multiplied by the sensitivity of the pixel (typically expressed in electrons/lux-second), and a transaction factor. The transaction factor represents a conversion of electrons to digital values (e.g. LSB values as noted herein). Thus, a weighting or "gain" applied to this path will directly increase the transaction factor. The transaction factor is typically increased with sensor analog gain configurations, which is generally higher for dark conditions and lower for bright conditions. The sensitivity and the transaction factor of the image-based sensor may be determined using information of the hardware architecture of the sensor used to acquire the test image and results of a lab-based characterization of the sensor (e.g. using the European Machine Vision Association (EMVA) 1288 electronic machine vision measurement standard). The translation factor is typically expressed in LSB (codes) per electron. Thus, the entries in the decompression LUT 302 may represent a brightness level of each pixel that is the result of a photodiode identified with each respective pixel being integrated over a particular time period, which has been multiplied by the sensitivity and the translation factor of the sensor used to acquire the test image. Thus, in this example, knowledge of the translation factor may be used to convert the entries in the decompression LUT 302 back to electrons, and knowledge of the electron per pixel may then be used in accordance with the sensitivity and integration time, pixel integration time, and pixel or analog gain (which affects the transaction factor) as well as digital gain, to derive a light level per pixel in accordance with the specific operating parameters of the sensor. Of course, any suitable information regarding the operating parameters of the sensor that may impact the light level may be additionally or alternatively implemented to modify the entries of the decompression LUT 302 to generate the light level LUT 304, such as sensor temperature for example.

In any event, the light level LUT 304 functions to decompress the compressed pixel values identified with the test image by mapping pixel values represented in the N-bit resolution to light level entries in the light level LUT 304 represented in the M-bit resolution. These light level values may then be implemented to further modify the entries of the decompression LUT 302 to generate the SNR LUT 306. To do, aspects include generating a SNR model that generates a prediction of electrons based on the integration and gains (both analog and digital) used to capture each exposure of the HDR image, which is identified with a signal portion and a noise portion of images acquired by the sensor used to acquire the test image. The SNR model is generated to provide the prediction of electrons as a function of the light level per pixel identified above as part of the entries of the light level LUT 304, as well as the noise generated (reference in units of electrons) at each pixel, and/or any suitable number and/or type of operating parameters the sensor used to acquire the test image. For example, the SNR model may be generated that outputs a prediction of electrons identified with the signal portion and the noise portion of images acquired by the sensor on a per pixel basis as a function of the light level per pixel, the sensor operating parameters, and the noise parameters. The sensor operating parameters and the noise parameters may be known a priori or otherwise determined with respect to the sensor used to acquire the test image.

For example, the SNR model may be generated using the sensor sensitivity and linear full well of the sensor, the noise parameters (which may include rates of various types of noise that are generated as images are acquired), the sensor configuration (e.g. the integration time and gain used with each of the HDR exposures), etc. As noted above for the light level LUT 304, any suitable information regarding the operating parameters of the sensor that may impact the SNR levels may additionally or alternatively implemented to modify the entries of the decompression LUT 302 to generate the SNR LUT 306, such as sensor temperature for example. Moreover, the SNR LUT 306 may additionally or alternatively be generated using the SNR model that may be derived and/or generated using any suitable type of machine learning techniques. For example, parts of one or more images may be labeled as noisy (i.e. having noise exceeding a predetermined threshold level). This data (i.e. the labeled images) may be selected to utilize the same range and/or depict the same usage range that is expected from a final SNR model based upon the actual operating conditions of the image sensor and/or known properties of the image sensor. The expected ranges may be determined in accordance with the particular application for which the SNR model is to be generated, and thus may consider parameters such as lighting, temperature, etc. Thus, such machine learning techniques may be implemented to generate an initial SNR model using known and/or measured sensor parameters, which is then further optimized based on machine learning using a dataset (e.g. a training dataset) that includes the labeled image(s) as noted above to generate an optimized (i.e. final) SNR model to generate the entries of the SNR LUT 306.

In this way, the SNR model may represent any suitable type of predictive model that provides a signal and a noise portion per pixel, which may be used to calculate a SNR per pixel as a function of both the light level value from the light level LUT 304, the sensor operating parameters, and the noise parameters. The SNR predictive model may be constructed in accordance with any suitable techniques, including known techniques to do so. As one example, the SNR model may be implemented by considering a dataset in which sensor operating parameters such as gain settings, integration times, transaction factors, etc., are modified for specific light level per pixel values to calculate, on a per pixel basis, an amount of signal and an amount of noise generated.

Thus, the entries of the SNR LUT 306 represent SNR values that are mapped to corresponding N-bit pixel values. The entries in the SNR LUT 306 thus yield a corresponding SNR value for compressed pixel values as a result of the consideration of the various sensor operating parameters and noise parameters as noted above. In other words, the SNR LUT 306 functions to decompress the compressed pixel values by mapping pixel values represented in the N-bit resolution to SNR level entries represented in the M-bit resolution. In some aspects, it is noted that the transform need not be applied to every pixel within the test image. Instead, and to further reduce the computational power required to create the 2D SNR profile, aspects include the light level LUT 304 and/or the SNR LUT 306 implementing pixel values corresponding to pixels from a portion of the test image (e.g. ¼th of the image) by applying the transform (i.e. mapping) to 1 pixel out of each 2×2 group of pixels. Of course, any portion of the test image may be used in this manner to generate the SNR LUT 306 by acknowledging a tradeoff between computational power and accuracy.

The aspects discussed herein reference the use of the decompression LUT 302, as the pixel values received from the image sensor are presumed to be in a compressed N-bit resolution as is typical for HDR image applications. However, this is by way of example and not limitation, and the use of the decompression LUT 302 is optional. For instance, when the pixel values identified with the test image are already in a decompressed format, then the separate decompression LUT is not needed. In accordance with such aspects, the light level 304 may be generated having entries that map the (already) decompressed pixel values to per pixel light values, which may be calculated in the same manner as discussed above with respect to the use of sensor operating parameters, for instance. The SNR LUT 306 may then be calculated in the same manner as noted above to map the decompressed pixel values to SNR values (e.g. using the light level per pixel, the SNR model, and the various sensor operating parameters).

Furthermore, it is noted that the entries of the decompression LUT 302, the light level LUT 304, and the SNR LUT 306 are described herein with reference to representation in an M-bit resolution. However, this is considered a maximum bit resolution in this context, as the range of light level values and/or the SNR values in the light level LUT 304 and the SNR LUT 306, respectively, may not span a range of values that requires such a high resolution. In fact, given the calculated range of values for the entries of the light level LUT 304 and/or the SNR LUT 306, the light level values and/or the SNR values may be represented using a lower bit resolution compared to the N-bit resolution of the compressed pixel values as noted above.

In any event, and turning now to FIG. 3C, once the SNR LUT 306 is generated from the test image, a subsequently-acquired target image may be analyzed on a per pixel basis to determine, for each pixel, a SNR value. To do so, a subsequently-acquired target image may include a set of compressed pixel values, as noted above for the text image. The set of pixel values for the target image may then be transformed by mapping the target image pixel values to entries in the SNR LUT 306, thereby generating the 2D SNR map 352 as shown in FIG. 3C.

The 2D SNR map 352 may alternatively be referred to herein as a "heat map" or "2D SNR profile," which identifies an SNR level for each pixel of a subsequently-acquired target image. The 2D SNR map may then be correlated (e.g. via the one or more processors 102, one or more of the processors 214A, 214B, 216, 218, etc.) to the target image to improve upon various image processing, AV, and/or ADAS functions as further discussed herein. Aspects include using the 2D SNR profile to facilitate identification (or estimation) of parts of a subsequently-acquired target image that will have low SNR (poor quality) based on measurements taken for each pixel captured, and to predict how the SNR will improve for each object within the scene based on each one of several possible adjustment to the sensor (which may include each one of all possible adjustments or a smaller subset of all possible adjustments of the operating parameters as discussed herein).

It is noted that the transform provided by way of the SNR LUT 306 is unique as it identifies where in a target image quality concerns may exist by way of the 2D SNR map, and may provide this information to the CV algorithms of the safety system 200 to lower the chances of false classification of objects or road conditions, as discussed in further detail below. The aspects as discussed herein thus function to expand upon the possible use of a camera outside the boundaries typically set by classic control methods, which are based upon image statistics. That is, the generation of the 2D SNR profile may allow an AV or ADAS system to identify parts of an image that may have worse performance compared to others, and to then adapt the sensor operating parameters to potentially improve the SNR of pixels within regions of subsequent target images that are identified with objects to be detected.

For instance, the transform provided by way of the SNR LUT 306 may illustrate how a change in a target image will adjust the SNR of all objects within the image, or regions(s) of interest within the target image, and may also be prioritized based on objects or road conditions that the image acquisition device(s) 104 sense in a particular scene. Thus, aspects include modifying the operating parameters of the sensor (e.g. the one or more image acquisition devices 104) to obtain a higher SNR for pixels in a subsequently-acquired image, which may include pixels for the entire image or portions thereof.

For example, the AV and/or ADAS system of the vehicle 100 (e.g. the safety system 200) may classify an object or a characteristic of a scene identified by acquired target image(s). The use of the 2D SNR map may be applied to subsequent target images for such a purpose to improve upon the accuracy of such an object and/or scene characteristic classification system. In other words, the 2D SNR map may be used to perform AV and/or ADAS related functions, which may include the classification of one or more objects and/or the characteristic of a scene identified with a target image. Thus, once objects and/or characteristic of a scene are identified using a target image, the 2D SNR map enable the identification of regions (i.e. pixels) within the target image having a SNR that is less than a threshold value. In response, this may cause the safety system 200 to then adjust the operating parameters of the image-based sensor(s) to re-acquire additional target images having an improved SNR (for particular pixels or the overall image). Once a 2D SNR map indicates that the re-acquired target image and/or regions thereof have pixel SNR values exceeding the threshold value, the re-acquired target image may then be used to perform object and/or scene characteristic classification using this re-acquired target image, thereby ensuring a higher accuracy of the classification system in doing so.

Thus, aspects include the transform being applied to subsequently-acquired target images via application of the SNR LUT 306 based on a current configuration and for one or more possible sensor configuration changes (i.e. the sensor operating parameters as discussed herein) that the safety system 200 may select. Thus, in some aspects the test image and the target image may be acquired a short time interval from one another (e.g. within a few milliseconds to account for processing time to apply the LUT entries) or, in some aspects, may actually be the same image. In either case, the SNR LUT 306 allows the safety system 200 to predict where noise will show up in subsequently-acquired images under similar conditions for specific sensor operating parameters. This allows the sensor operating parameters to be adjusted such that the resulting 2D SNR map is then improved for the entire scene or portions of the scene that are of particular interest. In accordance with such aspects, the SNR LUT 306 may be dynamically and continuously modified (e.g. in real-time) to improve upon the manner in which object and scene characteristic classifications are performed using acquired images.

In this way, the SNR LUT 306 may be dynamically adjusted over time as new test images are acquired to adapt to various driving conditions. For instance, the light level LUT 304 and the SNR LUT 306 may represent further modifications to the entries identified with the decompression LUT 302 based upon a change in any suitable number and/or type of sensor operating parameters identified with the image acquisition device(s) 104, which may result in an improvement to the SNR values for pixels in one or more portions of subsequently-acquired target images.

Therefore, the 2D SNR profile may be implemented via the safety system 200 to facilitate the AV and/or ADAS system of the vehicle 100 to make improved control decisions while the AV or ADAS camera is engaged in driving. For instance, the 2D SNR profile may identify to the computer vision (CV) algorithms (including machine learning and neural network based, which are implemented in a respective ADAS or AV system) to detect objects in the scene and/or the parts of the image that could have reduced quality (e.g. the road surface, objects that could be cars or pedestrians, signage, etc.).

One example of a prioritization and corresponding operating parameter adjustment includes the identification of a noise non-linearity on part of a road surface, which may be caused by a multi-exposure HDR image sensor that would otherwise lead to a false texture being detected on the road surface. In this scenario, the information provided by the 2D SNR map may be used by the safety system 200 to control the camera and to remove the noise non-linearity, or to move the noise non-linearity to another part of the image, such as to the foliage on either side of the road, for instance.

Another example of such a prioritization and a corresponding operating parameter adjustment includes a nighttime driving scenario in which a 2-dimensional SNR profile may identify to the AV or ADAS system that the decision to classify an object (e.g. a pedestrian on the road), was made with a poor SNR. That is, the SNR values for the pixels identified with the object may be less than a predetermined threshold SNR value. Thus, an increase in the camera exposure will improve the SNR around the object and facilitate the identification of a noise non-linearity in the cone of light emitted by a nearby street lamp that is also within the scene.

Figure 4A:
FIG. 4A illustrates an example acquired target image, in accordance with one or more aspects of the present disclosure.
Figure 4B:
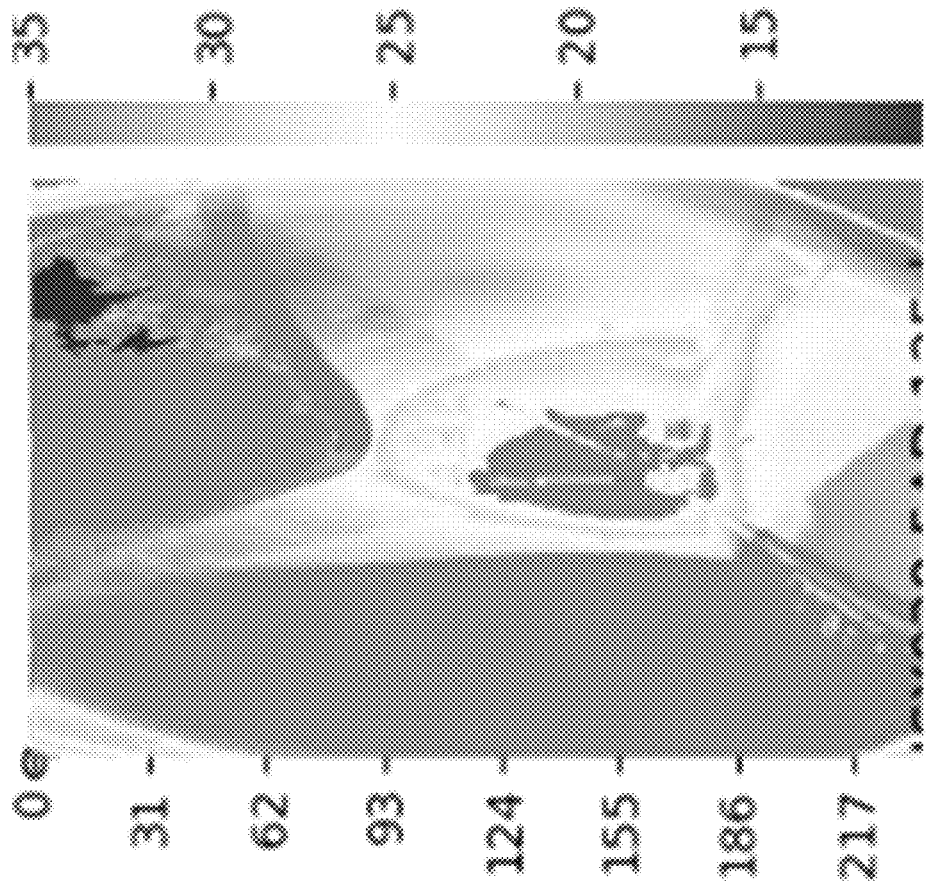
FIGS. 4B-4D illustrates example 2D SNR heat maps identified with the target image, in accordance with one or more aspects of the present disclosure.
Figure 4C:
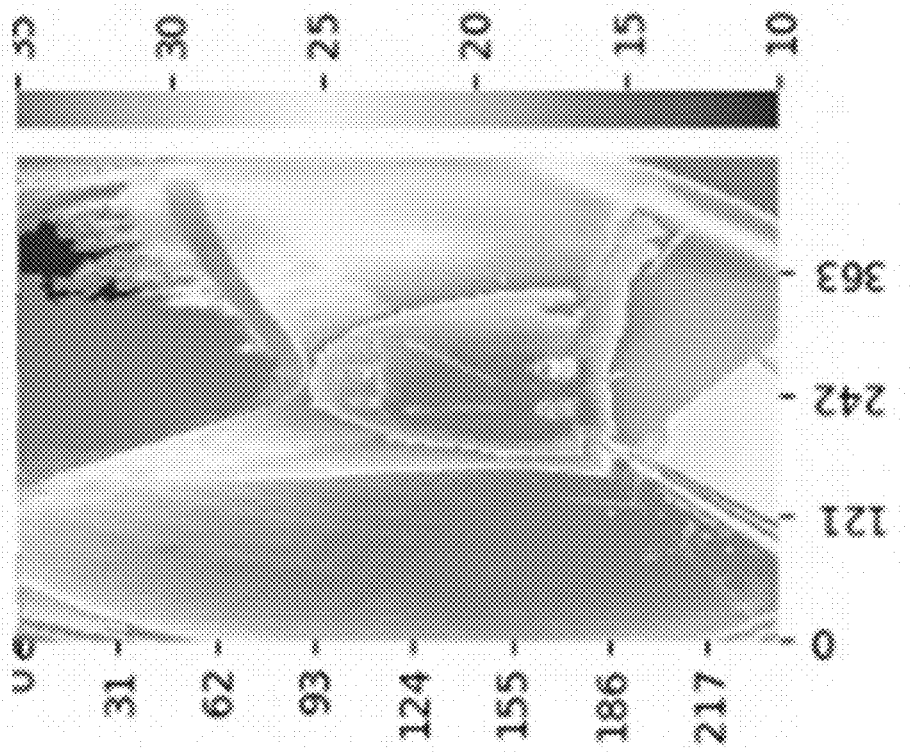
Figure 4D:
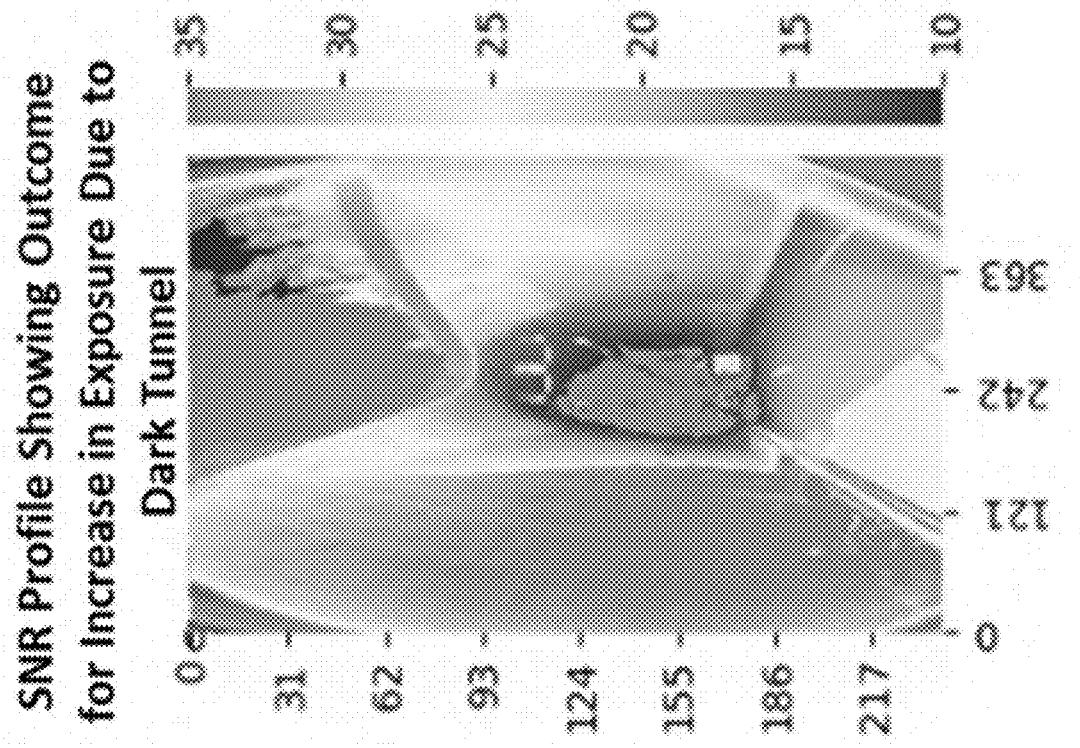

An illustrative example of the application of the 2D SNR heat map as discussed herein is shown with reference to FIG.s. 4A-4D. For instance, FIG. 4A illustrates an example acquired target image, in accordance with one or more aspects of the present disclosure, whereas FIGS. 4B-4D illustrate example 2D SNR maps identified with the target image, in accordance with one or more aspects of the present disclosure. The target image as shown in FIG. 4A is identified with a tunnel entrance. The 2D SNR heat maps as shown in FIGS. 4B-4D show the SNR calculated by the SNR LUT 306 transform represented on a logarithmic scale (i.e. (20*log 10(SNR)). The image in FIG. 4B shows an expected result in typical driving conditions. The image shown in FIG. 4C shows how the SNR map identifies a lower SNR on the road surface because of higher temperatures. The image in FIG. 4D shows the effect of the SNR of the road if the safety system 200 increases the exposure of an image-based sensor identified with the one or more image acquisition devices 104 to then better identify objects within the darker tunnel.

It is noted that the aspects described herein may also function to provide the 2D SNR profile generated from a target image to the CV algorithms used by the safety system 200 to thereby indicate areas of the target image where noise will be present in the scene, thus avoiding an incorrect classification of objects or characteristics of the scene. As an illustrative example, the 2D SNR profile may identify a sudden appearance of noise on the road surface due to non-uniform lighting which, on the road, may be falsely classified as changes in the road or an object on the road.

Another example may include the identification of portions in a target image where sensor performance has been reduced due to changing conditions (e.g. increased temperature of the image sensor), which may reduce the detection of far-away objects at night and indicate a reduced distance in which an safety system 200 may detect an object on the road.

The additional information provided by the 2D SNR profile of a target image and each possible sensor operating parameter adjustment may be used in parallel with traditional methods to control the image sensor configuration when adjusting to changes in the scene, thereby achieving better image quality for computer vision applications. The result is that the camera control will identify configuration updates to improve SNR of pixels identified with objects that are important within the scene, thereby improving ADAS or AV performance.

Additionally or alternatively, aspects include the safety system 200 generating and/or accessing a stored 2D SNR profile matching respective sensor operating parameter configurations. For example, a set of predetermined sensor configurations may be stored as sensor operating parameter profiles, each defining specific operating parameters of the sensor such as exposure times, integration times, etc. Each sensor operating parameter profile may then be linked to specific 2D SNR profiles such that different configuration options may be suggested by the host (e.g. the AV or ADAS vehicle system) to adjust the SNR of each part of the scene and/or portions of a scene in response to specific types or patterns of 2D SNR maps.

Again, the SNR LUT 306 may be dynamically and continuously modified to improve upon the manner in which object and scene characteristic classifications are performed using acquired images. However, the aspects described herein may additionally or alternatively be implemented during AV and ADAS system design to predict camera performance across a range of challenging conditions (e.g. high image sensor temperature). For instance, the aspects described herein may be implemented across variations of camera-to-camera differences using a set of driving images and data captured while driving. This prediction may help to optimize the design of the AV or ADAS systems' camera control.

As one illustrative example, the aspects described herein may be of particular importance to image sensor designers and/or AV/ADAS system designers with respect to the integration of sensors into the vehicle 100 (e.g. as part of the one or more image acquisition devices 104). Therefore, the use of the SNR LUT 306 as discussed herein may be adapted to identify how particular sensor operating parameters may impact the SNR for a resulting acquired image. This may include performing a test drive with the vehicle 100 using a particular image sensor under test to acquire one or more images as part of a set of test images. Using the sensor operating parameters of the sensor under test and the collected test images, the entries of the SNR LUT 306 may then be modified to ensure that the SNR values accurately reflect the operation of the sensor under test if installed and used in the vehicle 100. This may be of particular use to sensor designers to predict the generated noise in the acquired images if installed in a target vehicle, thus accurately predicting the degree and location of noise in acquired images to identify whether additional sensor design modifications are needed.

Figure 5:
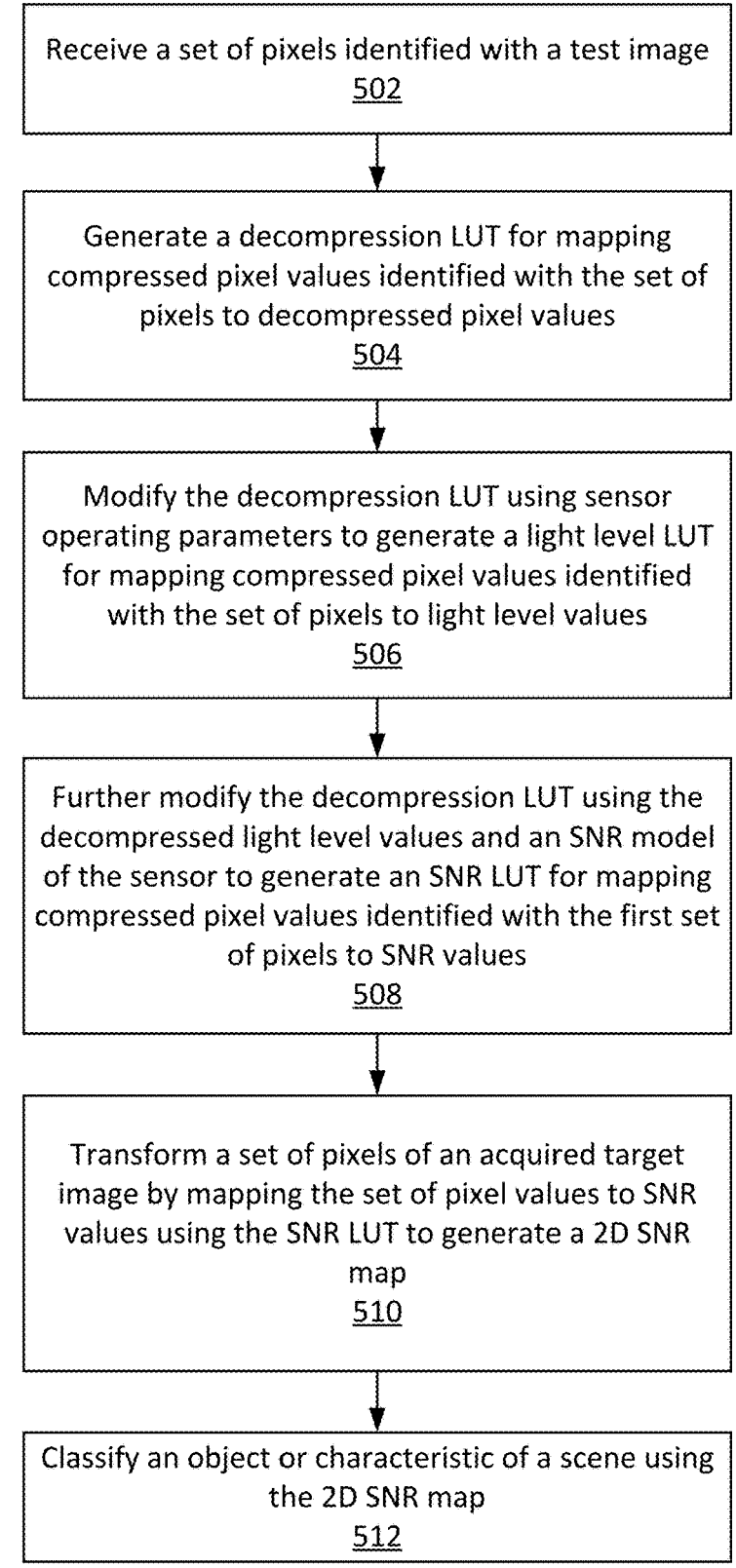
FIG. 5 illustrates an example overall process flow to classify an object or characteristic of a scene using a 2D SNR map, in accordance with one or more aspects of the present disclosure.

FIG. 5 illustrates an example overall process flow to classify an object or characteristic of a scene using a 2D SNR map, in accordance with one or more aspects of the present disclosure. With reference to FIG. 5, the flow 500 may be a computer-implemented method executed by and/or otherwise associated with one or more processors (processing circuitry) and/or storage devices. These processors and/or storage devices may be associated with one or more computing components identified with the safety system 200 of the vehicle 100 as discussed herein (such as the one or more processors 102, one or more of the processors 214A, 214B, 216, 218, etc.). Alternatively, the processors and/or storage devices may be identified with a separate computing device that may be in communication with the vehicle 100, such as an aftermarket computing device and/or the computing device 600 as shown and discussed in further detail herein with respect to FIG. 6.

The one or more processors identified with one or more of the components as discussed herein may execute instructions stored on other computer-readable storage mediums not shown in the Figures (which may be locally-stored instructions and/or as part of the processing circuitries themselves). The flow 500 may include alternate or additional steps that are not shown in FIG. 5 for purposes of brevity, and may be performed in a different order than the steps shown in FIG. 5.

Flow 500 may begin when one or more processors receive (block 502) a set of pixels identified with a test image. The set of pixels may be retrieved from a suitable memory location and/or received from an image sensor as the test image is acquired, as noted herein. The pixels identified with the test image may be identified with respective pixel values, which may optionally be compressed when received and thus be represented in an N-bit resolution.

Flow 500 may include one or more processors generating (block 504) a decompression LUT for mapping the compressed pixel values identified with the test image to decompressed pixel values. Again, this may include the generation of the decompression LUT 302, which functions to map the N-bit pixel values as noted herein to M-bit pixel values.

The process flow 500 includes the one or more processors modifying (block 506) the decompression LUT for mapping the compressed pixel values identified with the test image to decompressed light level values. This may include modifying entries of the decompression LUT 302, as noted herein, to include entries that correspond to light levels of each pixel in the test image. This may include, as noted above with reference to FIG. 3A, using sensor operating parameters identified with the image sensor used to generate the test image to generate entries in the light level LUT 304 that correspond to decompressed light level entries identified with each pixel of the test image.

The process flow 500 includes the one or more processors further modifying (block 508) the entries of the decompression LUT 302 for mapping the compressed pixel values identified with the test image to decompressed SNR level values. This may include modifying entries of the decompression LUT 302, as noted herein, to include entries that correspond to SNR levels of each pixel in the test image. This may include, as noted above with reference to FIG. 3A, using the light level pixel values, the SNR model, and sensor operating parameters identified with the image sensor used to generate the test image to generate the decompressed SNR entries in the SNR LUT 306.

The process flow 500 includes the one or more processors transforming (block 510) a set of pixels identified with a target image acquired by the image sensor. This may include, as discussed herein, mapping the set of pixels identified with a target image to the SNR values using the SNR LUT to thereby generate a 2D SNR map corresponding to the pixels in the target image.

The process flow 500 includes the one or more processors classifying (block 512) an object or characteristic of a scene using the 2D SNR map. This may include, as noted herein, the safety system 200 of the vehicle 100 correlating the 2D SNR map with the target image to perform object or scene classification using an initial target image and/or a target image that has been re-acquired by adjusting operating parameters of the image-based sensor to provide improved SNR pixel values. Thus, the 2D SNR map may be implemented for this purpose to ensure that the object and/or scene characteristic classification provides an accurate result by using pixels having an SNR value that exceeds a predetermined threshold value.

Figure 6:
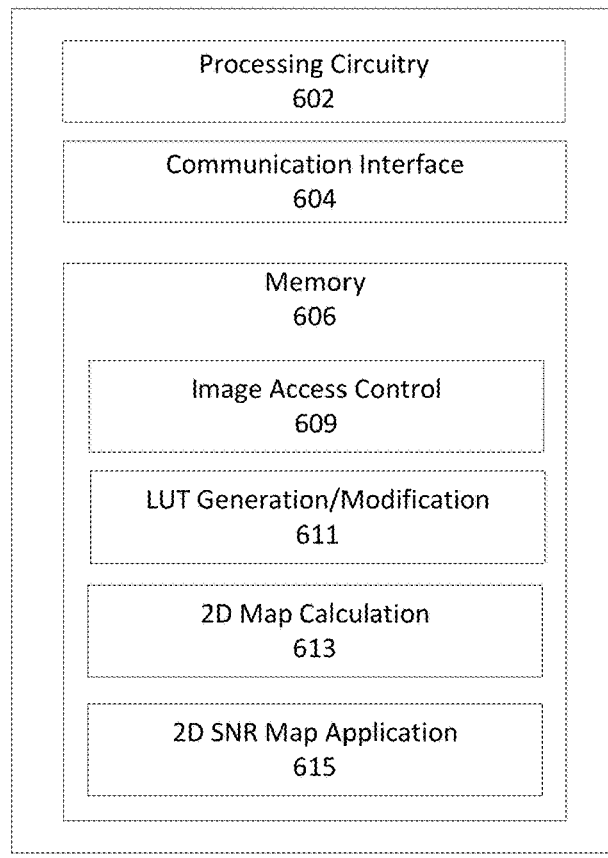
FIG. 6 illustrates an example computing device, in accordance with one or more aspects of the present disclosure.

FIG. 6 illustrates a block diagram of an exemplary computing device, in accordance with an aspects of the disclosure. In an aspect, the computing device 600 as shown and described with respect to FIG. 6 may be identified with a component of the safety system 200 as discussed herein or a separate computing device that may be implemented within the vehicle 100 or in any suitable environment. As further discussed below, the computing device 600 may perform the various functionality as described herein with respect to generating and/or accessing the decompression LUT 302, the light level LUT 304, and/or the SNR LUT 306, acquiring pixel values for test and target images, mapping pixel values to any of the decompression LUT 302, the light level LUT 304, and/or the SNR LUT 306, generating 2D SNR maps for target images, modifying the operating parameters of image sensors used to acquire target images, classifying objects and/or characteristics of a scene using target images and the generated 2D SNR map, etc.

To do so, the computing device 600 may include processing circuitry 602, a communication interface 604, and a memory 606. The components shown in FIG. 6 are provided for ease of explanation, and the computing device 600 may implement additional, less, or alternative components as those shown in FIG. 6.

The processing circuitry 602 may be configured as any suitable number and/or type of computer processors, which may function to control the computing device 600 and/or other components of the computing device 600. The processing circuitry 602 may be identified with one or more processors (or suitable portions thereof) implemented by the computing device 600, and may include processors identified with the safety system 200 as discussed herein (e.g. the one or more processors 102, one or more of the processors 214A, 214B, 216, 218, etc.) The processing circuitry 600 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 602 may be configured to carry out instructions to perform arithmetical, logical, and/or input/output (I/O) operations, and/or to control the operation of one or more components of computing device 600 to perform various functions as described herein. The processing circuitry 602 may include one or more microprocessor cores, memory registers, buffers, clocks, etc., and may generate electronic control signals associated with the components of the computing device 600 to control and/or modify the operation of these components. The processing circuitry 602 may communicate with and/or control functions associated with the communication interface 604 and/or the memory 606.

The communication interface 604 may be configured as any suitable number and/or type of components configured to facilitate the computing device 600 receiving test and/or target images acquired via a suitable image sensor as discussed herein, which may be via communications with the image sensor and/or by accessing data from a memory location at which the test and/or target images are stored. The communication interface 604 may be implemented as any suitable number and/or type of components that function to interface with an image sensor and/or a memory for this purpose, such as buses, ports, data interfaces, memory controllers, etc. The communication interface 604 may form part of an overall communication circuitry implemented by the computing device 600, which may be implemented via the computing device 600 to transmit commands and/or control signals to the image sensors to modify the sensor operating parameters, configuration, etc., as discussed herein.

The memory 606 is configured to store data and/or instructions such that, when the instructions are executed by the processing circuitry 602, cause the computing device 600 (or the vehicle 100 and/or safety system 200 of which the computing device 600 may form a part) to perform various functions as described herein. The memory 606 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 606 may be non-removable, removable, or a combination of both. The memory 606 may be implemented as a non-transitory computer readable medium storing one or more executable instructions such as, for example, logic, algorithms, code, etc.

As further discussed below, the instructions, logic, code, etc., stored in the memory 608 are represented by the various modules as shown in FIG. 6, which may enable the various functions of the aspects as described herein to be functionally realized. Alternatively, if implemented via hardware, the modules shown in FIG. 6 associated with the memory 606 may include instructions and/or code to facilitate control and/or monitor the operation of such hardware components. In other words, the modules as shown in FIG. 6 are provided for ease of explanation regarding the functional association between hardware and software components. Thus, the processing circuitry 602 may execute the instructions stored in these respective modules in conjunction with one or more hardware components to perform the various functions as discussed herein.

The image access control module 609 may execute the functionality as discussed herein with reference to receiving test and/or target images from an image-based sensor. The executable instructions stored in the image access control module 609 may facilitate, in conjunction with execution via the processing circuitry 602, the computing device 600 receiving test images and/or target images as discussed above. This may include parsing and/or retrieving the set of pixels identified with the test and target images, as well as the timing regarding when to retrieve the test and target images for object and scene classification as noted herein.

The LUT generation/modification module 611 may execute the functionality as discussed herein with reference to the generation and/or modification of the decompression LUT 302, the light level LUT 304, and/or the SNR LUT 306. The executable instructions stored in the LUT generation/modification module 611 may facilitate, in conjunction with execution via the processing circuitry 602, the computing device 600 dynamically modifying the entries of the decompression LUT 302 to generate the light level LUT 304 and/or the SNR LUT 306. Again, this may include identifying specific sensor operating parameters, using the light level values, and/or using the SNR model as discussed herein to calculate the new entries of the light level LUT 304 and the SNR LUT.

The 2D map calculation module 613 may execute the functionality described herein with reference to the generation of a 2D SNR map for target images. Thus, the executable instructions stored in the 2D map calculation module 613 may facilitate, in conjunction with execution via the processing circuitry 602, the computing device 600 mapping pixels of target images to the entries in the SNR LUT 306, as discussed herein.

The 2D SNR map application module 615 may execute the functionality as described with reference to the use of the 2D SNR map to perform AV and/or ADAS related functions, such as the classification of objects and/or scene characteristics using the 2D SNR map data. Thus, the executable instructions stored in the 2D SNR map application module 615 may facilitate, in conjunction with execution via the processing circuitry 602, the computing device 600 identifying regions (i.e. pixels) within an target image having a SNR less than a threshold value, which may function to indicate that target images should be re-acquired with updated sensor operating parameters prior to performing object classification or otherwise using the target image (or portions thereof) for image-processing or CV-based tasks.

This may additionally or alternatively include controlling and/or adjusting the operating parameters of image-based sensor(s) such that the newly-acquired target images have an overall SNR value, portions thereof (i.e. pixels) have an SNR value that represents an improvement compared to that of the previously-acquired images. In other words, the pixels in a newly-acquired target image now have SNR values that are improved and thus exceed the predetermined SNR threshold value, and are suitable for the classification of objects and/or scene characteristics.

EXAMPLES

The following examples pertain to further aspects.

An example (e.g. example 1) is a computing device, comprising: a memory configured to store computer-readable instructions; and processing circuitry configured to execute the computer-readable instructions to cause the computing device to: receive a first set of pixel values identified with a first image acquired by a sensor, each one of the first set of pixel values corresponding to a respective pixel of the first image, generate a first LUT based upon one or more operating parameters identified with the sensor such that entries of the first LUT represent light levels mapped to respective pixel values; generate a second LUT based upon (i) a signal-to-noise ratio (SNR) model associated with the sensor, and (ii) the light levels mapped to the respective pixel values, such that entries of the second LUT represent SNR levels mapped to respective pixel values; transform a second set of pixel values, each one of the second set of pixel values corresponding to a respective pixel of a second image acquired by the sensor, to a two-dimensional (2D) SNR map associated with the second image by mapping the second set of pixel values to entries in the second LUT; and classify, using the 2D SNR map, an object or a characteristic of a scene identified by the second image.

Another example (e.g. example 2) relates to a previously-described example (e.g. example 1) wherein: the first set of pixel values are compressed pixel values represented in a first bit resolution, and entries of the first LUT and entries of the second LUT are digital values represented in a second resolution that is higher than the first bit resolution.

Another example (e.g. example 3) relates to a previously-described example (e.g. one or more of examples 1-2), wherein the processing circuitry is configured to execute the computer-readable instructions to cause the computing device to: generate a decompression LUT based upon a type of compression used to generate the first set of pixel values as compressed pixel values, which functions to decompress the compressed pixel values by mapping the first set of pixel values represented in the first bit resolution to entries in the decompression LUT represented in the second bit resolution.

Another example (e.g. example 4) relates to a previously-described example (e.g. one or more of examples 1-3), wherein the processing circuitry is configured to execute the computer-readable instructions to cause the computing device to generate the first LUT and the second LUT by modifying entries of the decompression LUT.

Another example (e.g. example 5) relates to a previously-described example (e.g. one or more of examples 1-4), wherein the first LUT functions to decompress compressed pixel values by mapping pixel values represented in the first bit resolution to light level entries in the first LUT represented in the second bit resolution.

Another example (e.g. example 6) relates to a previously-described example (e.g. one or more of examples 1-5), wherein the second LUT functions to decompress the compressed pixel values by mapping pixel values represented in the first bit resolution to SNR level entries in the second LUT represented in the second bit resolution.

7 Another example (e.g. example 7) relates to a previously-described example (e.g. one or more of examples 1-6), wherein the operating parameters identified with the sensor used to generate the first LUT include one or more of an image brightness, a sensor temperature, an integration setting, and a gain setting of the sensor when the first image was acquired.

Another example (e.g. example 8) relates to a previously-described example (e.g. one or more of examples 1-7), wherein the SNR model outputs a prediction of electrons identified with a signal portion and a noise portion of images acquired by the sensor.

An example (e.g. example 9) is a computer-readable medium having instructions stored thereon that, when executed by processing circuitry of a vehicle, cause the vehicle to: receive a first set of pixel values identified with a first image acquired by a sensor, each one of the first set of pixel values corresponding to a respective pixel of the first image, generate a first LUT based upon one or more operating parameters identified with the sensor such that entries of the first LUT represent light levels mapped to respective pixel values; generate a second LUT based upon (i) a signal-to-noise ratio (SNR) model associated with the sensor, and (ii) the light levels mapped to the respective pixel values, such that entries of the second LUT represent SNR levels mapped to respective pixel values; transform a second set of pixel values, each one of the second set of pixel values corresponding to a respective pixel of a second image acquired by the sensor, to a two-dimensional (2D) SNR map associated with the second image by mapping the second set of pixel values to entries in the second LUT; and classify, using the 2D SNR map, an object or a characteristic of a scene identified by the second image.

Another example (e.g. example 10) relates to a previously-described example (e.g. example 9), wherein: the first set of pixel values are compressed pixel values represented in a first bit resolution, and entries of the first LUT and entries of the second LUT are digital values represented in a second resolution that is higher than the first bit resolution.

Another example (e.g. example 11) relates to a previously-described example (e.g. one or more of examples 9-10), wherein the instructions, when executed by the processing circuitry, cause the vehicle to: generate a decompression LUT based upon a type of compression used to generate the first set of pixel values as compressed pixel values, which functions to decompress the compressed pixel values by mapping the first set of pixel values represented in the first bit resolution to entries in the decompression LUT represented in the second bit resolution.

Another example (e.g. example 12) relates to a previously-described example (e.g. one or more of examples 9-11), wherein the instructions, when executed by the processing circuitry, cause the vehicle to: generate the first LUT and the second LUT by modifying entries of the decompression LUT.

Another example (e.g. example 13) relates to a previously-described example (e.g. one or more of examples 9-12), wherein the first LUT functions to decompress compressed pixel values by mapping pixel values represented in the first bit resolution to light level entries in the first LUT represented in the second bit resolution.

Another example (e.g. example 14) relates to a previously-described example (e.g. one or more of examples 9-13), wherein the second LUT functions to decompress the compressed pixel values by mapping pixel values represented in the first bit resolution to SNR level entries in the second LUT represented in the second bit resolution.

Another example (e.g. example 15) relates to a previously-described example (e.g. one or more of examples 9-14), wherein the operating parameters identified with the sensor used to generate the first LUT include one or more of an image brightness, a sensor temperature, an integration setting, and a gain setting of the sensor when the first image was acquired.

Another example (e.g. example 16) relates to a previously-described example (e.g. one or more of examples 9-15), wherein the SNR model outputs a prediction of electrons identified with a signal portion and a noise portion of images acquired by the sensor.

Another example (e.g. example 17) is a vehicle, comprising: a sensor configured to acquire images; a data interface configured to receive a first set of pixel values identified with a first image acquired by the sensor, each one of the first set of pixel values corresponding to a respective pixel of the first image; and processing circuitry configured to: generate a first LUT based upon one or more operating parameters identified with the sensor such that entries of the first LUT represent light levels mapped to respective pixel values; generate a second LUT based upon (i) a signal-to-noise ratio (SNR) model associated with the sensor, and (ii) the light levels mapped to the respective pixel values, such that entries of the second LUT represent SNR levels mapped to respective pixel values; transform a second set of pixel values, each one of the second set of pixel values corresponding to a respective pixel of a second image acquired by the sensor, to a two-dimensional (2D) SNR map associated with the second image by mapping the second set of pixel values to entries in the second LUT; and classify, using the 2D SNR map, an object or a characteristic of a scene identified by the second image.

Another example (e.g. example 18) relates to a previously-described example (e.g. example 9-17), wherein: the first set of pixel values are compressed pixel values represented in a first bit resolution, and entries of the first LUT and entries of the second LUT are digital values represented in a second resolution that is higher than the first bit resolution.

Another example (e.g. example 19) relates to a previously-described example (e.g. one or more of examples 17-18), wherein the processing circuitry is configured to: generate a decompression LUT based upon a type of compression used to generate the first set of pixel values as compressed pixel values, which functions to decompress the compressed pixel values by mapping the first set of pixel values represented in the first bit resolution to entries in the decompression LUT represented in the second bit resolution.

Another example (e.g. example 20) relates to a previously-described example (e.g. one or more of examples 17-19), wherein the processing circuitry is configured to: generate the first LUT and the second LUT by modifying entries of the decompression LUT.

Another example (e.g. example 21) relates to a previously-described example (e.g. one or more of examples 17-20), wherein the first LUT functions to decompress compressed pixel values by mapping pixel values represented in the first bit resolution to light level entries in the first LUT represented in the second bit resolution.

Another example (e.g. example 22) relates to a previously-described example (e.g. one or more of examples 17-21), wherein the second LUT functions to decompress the compressed pixel values by mapping pixel values represented in the first bit resolution to SNR level entries in the second LUT represented in the second bit resolution.

Another example (e.g. example 23) relates to a previously-described example (e.g. one or more of examples 17-22), wherein the operating parameters identified with the sensor used to generate the first LUT include one or more of an image brightness, a sensor temperature, an integration setting, and a gain setting of the sensor when the first image was acquired.

Another example (e.g. example 24) relates to a previously-described example (e.g. one or more of examples 17-23), wherein the SNR model outputs a prediction of electrons identified with a signal portion and a noise portion of images acquired by the sensor.

A method as shown and described.

An apparatus as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computing device, comprising:
    a memory configured to store computer-readable instructions; and
    processing circuitry configured to execute the computer-readable instructions to cause the computing device to:
        receive a first set of pixel values identified with a first image acquired by a sensor, each one of the first set of pixel values corresponding to a respective pixel of the first image,
        generate a first LUT based upon one or more operating parameters identified with the sensor such that entries of the first LUT represent light levels mapped to the first set of pixel values;
        generate a second LUT based upon (i) a signal-to-noise ratio (SNR) model associated with the sensor, and (ii) the light levels mapped to the first set of pixel values, such that entries of the second LUT represent SNR levels mapped to the first set of pixel values;
        transform a second set of pixel values, each one of the second set of pixel values corresponding to a respective pixel of a second image acquired by the sensor, to a two-dimensional (2D) SNR map associated with the second image by mapping the second set of pixel values to entries in the second LUT; and classify, using the 2D SNR map, an object or a characteristic of a scene identified by the second image.

2. The computing device of claim 1, wherein:

the first set of pixel values are compressed pixel values represented in a first bit resolution, and entries of the first LUT and entries of the second LUT are digital values represented in a second bit resolution that is higher than the first bit resolution.

3. The computing device of claim 2, wherein the processing circuitry is configured to execute the computer-readable instructions to cause the computing device to:

generate a decompression LUT based upon a type of compression used to generate the first set of pixel values as compressed pixel values, which functions to decompress the compressed pixel values by mapping the first set of pixel values represented in the first bit resolution to entries in the decompression LUT represented in the second bit resolution.

4. The computing device of claim 3, wherein the processing circuitry is configured to execute the computer-readable instructions to cause the computing device to generate the first LUT and the second LUT by modifying entries of the decompression LUT.

5. The computing device of claim 4, wherein the first LUT functions to decompress the compressed pixel values by mapping the compressed pixel values represented in the first bit resolution to light level entries in the first LUT represented in the second bit resolution.

6. The computing device of claim 4, wherein the second LUT functions to decompress the compressed pixel values by mapping the compressed pixel values represented in the first bit resolution to SNR level entries in the second LUT represented in the second bit resolution.

7. The computing device of claim 1, wherein the operating parameters identified with the sensor used to generate the first LUT include one or more of an image brightness, a sensor temperature, an integration setting, and a gain setting of the sensor when the first image was acquired.

8. The computing device of claim 1, wherein the SNR model outputs a prediction of electrons identified with a signal portion and a noise portion of images acquired by the sensor.

9. A non-transitory computer-readable medium having instructions stored thereon that, when executed by processing circuitry of a vehicle, cause the vehicle to:

receive a first set of pixel values identified with a first image acquired by a sensor, each one of the first set of pixel values corresponding to a respective pixel of the first image, generate a first LUT based upon one or more operating parameters identified with the sensor such that entries of the first LUT represent light levels mapped to the first set of pixel values;

generate a second LUT based upon (i) a signal-to-noise ratio (SNR) model associated with the sensor, and (ii) the light levels mapped to the first set of pixel values, such that entries of the second LUT represent SNR levels mapped to the first set of pixel values;

transform a second set of pixel values, each one of the second set of pixel values corresponding to a respective pixel of a second image acquired by the sensor, into a two-dimensional (2D) SNR map associated with the second image by mapping the second set of pixel values to entries in the second LUT; and classify, using the 2D SNR map, an object or a characteristic of a scene identified by the second image.

10. The non-transitory computer-readable medium of claim 9, wherein:

the first set of pixel values are compressed pixel values represented in a first bit resolution, and entries of the first LUT and entries of the second LUT are digital values represented in a second bit resolution that is higher than the first bit resolution.

11. The non-transitory computer-readable medium of claim 10, wherein the instructions, when executed by the processing circuitry, cause the vehicle to:

generate a decompression LUT based upon a type of compression used to generate the first set of pixel values as compressed pixel values, which functions to decompress the compressed pixel values by mapping the first set of pixel values represented in the first bit resolution to entries in the decompression LUT represented in the second bit resolution.

12. The non-transitory computer-readable medium of claim 11, wherein the instructions, when executed by the processing circuitry, cause the vehicle to:

generate the first LUT and the second LUT by modifying entries of the decompression LUT.

13. The non-transitory computer-readable medium of claim 12, wherein the first LUT functions to decompress the compressed pixel values by mapping the compressed pixel values represented in the first bit resolution to light level entries in the first LUT represented in the second bit resolution.

14. The non-transitory computer-readable medium of claim 12, wherein the second LUT functions to decompress the compressed pixel values by mapping the compressed pixel values represented in the first bit resolution to SNR level entries in the second LUT represented in the second bit resolution.

15. The non-transitory computer-readable medium of claim 9, wherein the operating parameters identified with the sensor used to generate the first LUT include one or more of an image brightness, a sensor temperature, an integration setting, and a gain setting of the sensor when the first image was acquired.

16. The non-transitory computer-readable medium of claim 9, wherein the SNR model outputs a prediction of electrons identified with a signal portion and a noise portion of images acquired by the sensor.

17. A vehicle, comprising:

a sensor configured to acquire images;

a data interface configured to receive a first set of pixel values identified with a first image acquired by the sensor, each one of the first set of pixel values corresponding to a respective pixel of the first image; and processing circuitry configured to:

generate a first LUT based upon one or more operating parameters identified with the sensor such that entries of the first LUT represent light levels mapped to the first set of pixel values;

generate a second LUT based upon (i) a signal-to-noise ratio (SNR) model associated with the sensor, and (ii) the light levels mapped to the first set of pixel values, such that entries of the second LUT represent SNR levels mapped to the first set of pixel values;

transform a second set of pixel values, each one of the second set of pixel values corresponding to a respective pixel of a second image acquired by the sensor, to a two-dimensional (2D) SNR map associated with the second image by mapping the second set of pixel values to entries in the second LUT; and classify, using the 2D SNR map, an object or a characteristic of a scene identified by the second image.

18. The vehicle of claim 17, wherein:
the first set of pixel values are compressed pixel values represented in a first bit resolution, and
entries of the first LUT and entries of the second LUT are digital values represented in a second bit resolution that is higher than the first bit resolution.

19. The vehicle of claim 18, wherein the processing circuitry is configured to:
generate a decompression LUT based upon a type of compression used to generate the first set of pixel values as compressed pixel values, which functions to decompress the compressed pixel values by mapping the first set of pixel values represented in the first bit resolution to entries in the decompression LUT represented in the second bit resolution.

20. The vehicle of claim 19, wherein the processing circuitry is configured to:
generate the first LUT and the second LUT by modifying entries of the decompression LUT.

21. The vehicle of claim 20, wherein the first LUT functions to decompress the compressed pixel values by mapping the compressed pixel values represented in the first bit resolution to light level entries in the first LUT represented in the second bit resolution.

22. The vehicle of claim 20, wherein the second LUT functions to decompress the compressed pixel values by mapping the compressed pixel values represented in the first bit resolution to SNR level entries in the second LUT represented in the second bit resolution.

23. The vehicle of claim 17, wherein the operating parameters identified with the sensor used to generate the first LUT include one or more of an image brightness, a sensor temperature, an integration setting, and a gain setting of the sensor when the first image was acquired.

24. The vehicle of claim 17, wherein the SNR model outputs a prediction of electrons identified with a signal portion and a noise portion of images acquired by the sensor.

* * * * *